JOHN W. PAYNE
CHARLES H. LECHTHALER
INVENTORS

JOHN W. PAYNE
CHARLES H. LECHTHALER
INVENTORS

JOHN W. PAYNE
CHARLES H. LECHTHALER
*INVENTORS*

BY *Oswald G. Hayes*
ATTORNEY

Patented Dec. 27, 1949

2,492,132

UNITED STATES PATENT OFFICE 2,492,132

PROCESS FOR HEAT-TREATING AND DRYING PARTICLE-FORM ABSORBENT SOLIDS

John W. Payne and Charles H. Lechthaler, Woodbury, N. J., assignors to Socony-Vacuum Oil Company, Incorporated, a corporation of New York Application January 29, 1946, Serial No. 644,131

2 Claims. (Cl. 34—13)

This invention relates to a process for treating solid particles with a gaseous agent at elevated temperatures and with a kiln for practicing said process. The invention is particularly concerned with a novel method and means for drying and heat treating particle form solids.

In the preparation of pelleted materials, the usual practice is to form pellets of the desired size and shape and subject the formed pellets to a drying and tempering action for conversion to a state having sufficient hardness and resistance to breakage to retain its shape during normal handling and usage. The heat treatment may also affect other properties of the solid, as for example, adsorbents may be activated by heating and the conditions of treatment are often governed by that consideration. It has been proposed to heat such substances by passing a current of heated gas therethrough in direct contact or to pass the solids in indirect heat exchange relationship with a heat transfer medium such as furnace gases and the like. Cooling of the treated particles has been performed in similar fashion. Other methods of accomplishing these purposes involved the use of rotary kilns, multiple hearth furnaces, continuous ovens and many others.

These previously known methods are wasteful of heat and, in most instances the treatment is non-uniform throughout the mass of particles. The present invention provides means for uniformly raising the temperature of a mass of particles while moving downwardly through a vertical treating zone and thereafter cooling the treated material and recovering therefrom a major proportion of the heat supplied for treatment.

The invention is characterized by a vertical treating zone in the upper portion of which particles are contacted countercurrent with a heating gas flowing in direct contact with the particles while the lower part of the treating zone contains means for passing a heat transfer fluid in countercurrent indirect heat exchange relationship with the particles. The heat taken up in the lower part of the zone is recovered and used for heating particles in the upper portion. Preferably the heating gas in the upper portion of the treating zone flows through a continuous tortuous passage substantially free of particles under treatment but in direct contact with the particles under treatment.

Direct contact between heat exchange gases and solids is a very efficient method of heat transfer and can easily be utilized to great advantage in the heating portion of the kiln. In the cooling zone, however, attempts to utilize direct contact are much less efficient and do not give uniform cooling nor maximum heat recovery.

Results actually observed in attempting to cool a mass by direct contact with a heat exchange gas show that channeling occurs to a very great extent and actual observations indicate that the channeling is self-aggravating. Even though the heat exchange zone be provided with means for rapidly redistributing the gas, it is found that one portion of the mass will be cooled to a greater degree than another portion thus resulting in a lower pressure in the zone of greater cooling. Gas from surrounding portions of the bed are diverted to the region of decreased pressure thus giving even greater cooling and reduction of pressure. The system rapidly produces a channel of excessive cooling to which the cooling gases are diverted from other portions of the bed with resultant poor heat exchange. This means that the whole mass of particles will be cooled to a lesser degree than that desired and that less heat will be recovered, thus increasing the cost of the operation.

These disadvantages are overcome according to the present invention by utilizing a kiln of the general nature of that shown in the annexed drawings wherein Figure 1 is a diagrammatic representation of the essential elements of a set-up for drying bauxite pellets;

Figure 1:
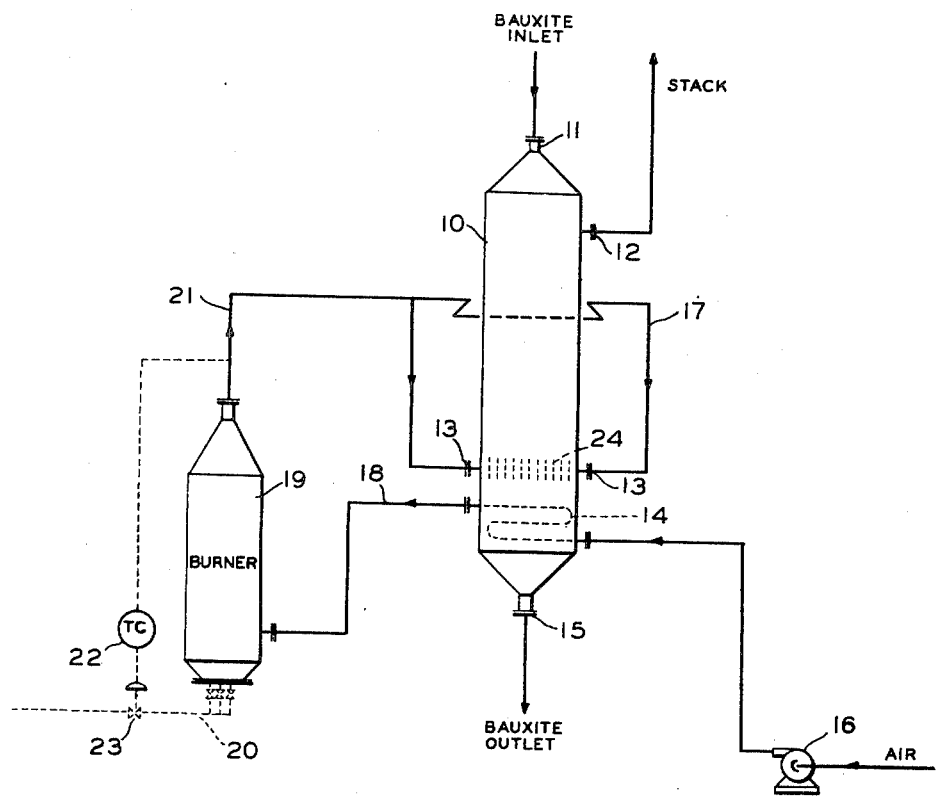
Figure 4:
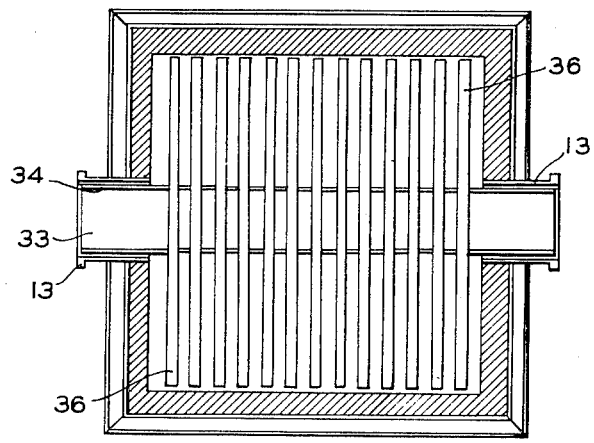
Figure 4 is a horizontal section on line 4—4 of Figure 2.

Referring specifically to Figure 1, the kiln indicated generally at 10 is provided with an inlet 11 at the top for admission of solid particles as from a hopper, elevator or car. The particles pass downwardly through a heating zone between a heating gas outlet 12 and heating gas inlets 13 and thence through a cooling zone having a cooling coil 14 to an outlet 15. Air is supplied by a compressor 16 to the cooling coil 14 through which the air passes in a generally countercurrent direction to the hot particles in the cooling zone. The heated air is withdrawn and transferred by line 18 to a line burner 19 wherein the preheated air is used for combustion of fuel, such as gas oil or gas admitted from fuel header 20. The hot products of combustion leave the line burner 19 by way of pipe 21 and cross-connection 17 to pass to the inlets 13. A temperature responsive control 22 in line 21 operates an automatic fuel supply valve 23 in the fuel header 20. The hot combustion gases are admitted to the mass of particles in kiln 10 by a distributor 24 shown in detail in Figures 2 and 4.

The heated air from line 18 may be further heated by indirect heat transfer means instead of the line burner shown. Thus the air may be passed through a heat exchanger in contact with tubes through which flows high pressure steam, products of combustion, a molten salt or the like.

Figure 2:
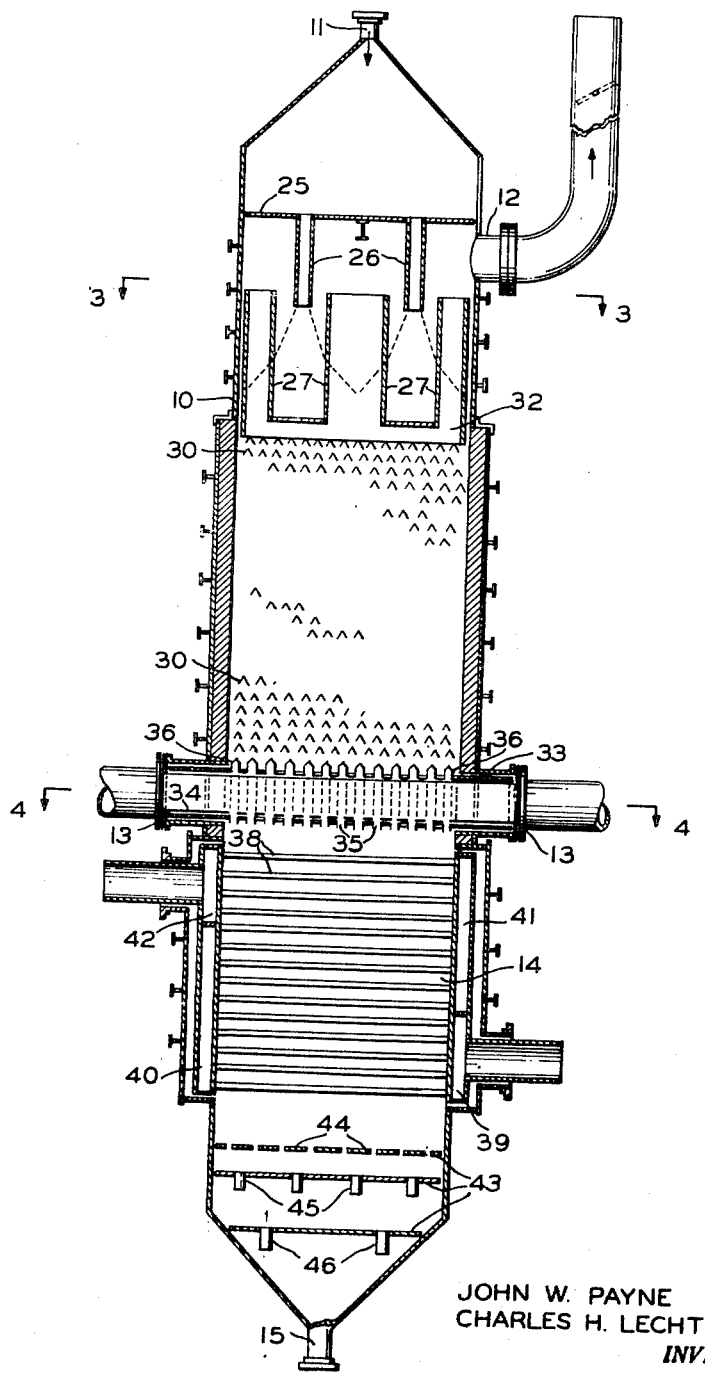
Figure 2 is a vertical section of the kiln shown in Figure 1.
Figure 3:
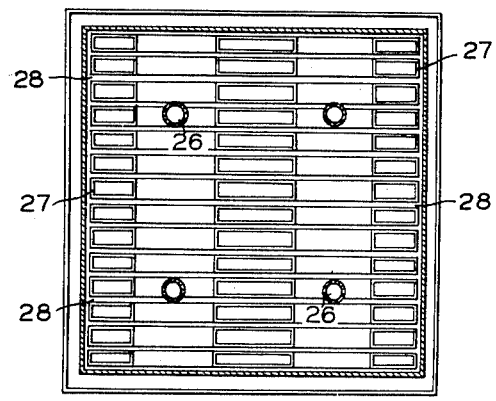
Figure 3 is a horizontal section on line 3—3 of Figure 2.

As shown in Figure 2, the mass of solid particles admitted at 11 fall onto a seal plate 25 in the top of the kiln having four depending feed legs 26 which feed the clay down into the kiln as indicated. At the top of the contacting zone is a vapor disengaging space having a number of flue gas collectors 27 arranged in groups of three as shown in Figure 3. Between adjacent groups of three collectors are open spaces 28 through which the pellets pass to the treating zone.

Figure 5:
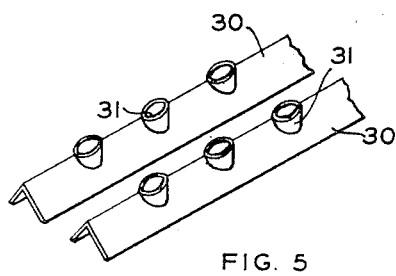
Figure 5 is a detail view of the distributing angles in the kiln.

The heating zone is provided with means to baffle the downwardly moving mass of pellets in such a manner as to provide a plurality of tortuous particle-free passages up through the bed of solid material through which the heat transfer gas can pass without forcing its way through any substantial thickness of particles. This baffling structure may be either spiral fins or packed angle irons, both being shown in detail in Simpson et al. Patent No. 2,331,433 issued October 5, 1940. In the specific form shown here the baffling means is made up of stacked angles 30 similar to those shown in detail in Figure 5. Essentially, the angles are simple elements similar to the usual angle irons used in construction of steel forms but are provided with a plurality of chimneys 31 along the heel.

These angles are mounted in the heating zone with the heel directed upwardly and with successive courses of angles laid with their lengths running in different directions. The arrangement of the angles is such that the chimneys open below the space of the next angle above at a point between chimneys of the angle next above. Thus heat transfer gas will flow along the underside of each angle iron in direct contact with the treated solids to a chimney from which it will pass upwardly into the open space under the next higher angle iron along which it will also flow to another chimney and thus through successive angles and chimneys to the top of the heating zone. The angles in the top of the heating zone open into the vapor space feeding the vapor collectors 27.

As will be readily seen from Figure 2, the three vapor collecting tubes 27 of each group thereof are interconnected by channels formed by a depending skirt 32 along each side of each group. All the gases from the top layer of angles are discharged into this channel from which they find their way to outlet 12 and are passed to the stack. If the kiln is operated in such manner that the gases from the heating zone still contain a substantial amount of heat they may be passed through suitable economizers. In general it is possible to operate the system in such manner that the flue gas is only slightly above normal atmospheric temperatures, thus completely utilizing the heating value of the gases in the kiln.

The heating gases are admitted to the heating zone through a manifold 33 having a liner 34 provided with perforations 35 along the length thereof. These perforations 35 feed to inverted troughs 36 which form a distributing grid across the kiln. The inverted troughs 36 are provided with chimneys of the same nature as chimneys 31 on the angle irons 30, the top of each inverted trough being substantially identical in structure with the angle irons 30. This provides a substantially uniform distribution of heating gas across the kiln at the level of introduction and uniformity is maintained throughout the height of the heating section by the nature of the passage through which the heating gas is passed through the heating section.

The particle form solids passing downwardly from the grid of distributing troughs 36 are fully treated and are then cooled for discharge from the kiln. As pointed out above, the pellets cannot be cooled evenly and efficiently by direct contact with a cooling gas and the invention provides a plurality of indirect heat exchange tubes 38 in the cooling section. The tubes are arranged in three banks and the cooling gases pass successively through banks in generally countercurrent direction with respect to the downwardly moving solids. Cold air from the compressor enters a header 39 from which the cooled gases pass transversely through the kiln to a header 40 which serves to feed the second bank of tubes. Gases from the second bank enter a header 41 which serves to feed the upper bank of tubes and the heated gas is thereafter withdrawn from the cooling section through header 42.

For proper operation of the kiln, it is essential that particle form solids flow downwardly at substantially the same rate from all points across the kiln. To effectuate this purpose the kiln is provided with flow controlling plates 43 of the general nature shown. The upper flow control plate 43 is provided with a large number of orifices 44 thus providing in effect a large number of outlets from the cooling section of the kiln and inducing substantially uniform flow across the kiln. Uniform flow through each of the orifices 44 is insured while maintaining control over the rate of flow by providing a lesser number of withdrawal pipes 45 from the intermediate plate 43. A similar effect for that intermediate plate is obtained by providing a small number of outlet points, in this case four, in the nature of pipes 46 depending from the bottom flow control plate 43. It will be recognized that uniform flow at the upper plate can be obtained by permitting free fall from that plate but this makes it impossible to control rate of flow at this point. It is only by providing a series of plates having a progressively small number of orifices that uniform flow can be obtained while maintaining a constant rate of flow for the whole kiln.

The present invention is not limited to drying of bauxite pellets as specifically disclosed above but is merely typified by that operation. In general, the process and apparatus are adapted to the drying and heat treatment of particle form solids, particularly absorbent solids, such as bone char, activated charcoal, activated clays of various types such as cracking catalysts and decolorizing clays as well as many other types of solids.

The present invention is seen to provide a treating method and means of maximum effectiveness. Smooth operation is only possible when substantial uniformity of temperature is maintained across the kiln at all levels. This requires uniform predetermined rate of flow throughout the treating zone and uniform treatment across the kiln at all levels. The interdependence of the several stages of the operation is aptly illustrated by consideration of the effect on the cooling zone of unequal heating in the heating zone resulting in a channel of relatively cold pellets entering the cooling zone. Such cold stream of solids would cool certain heat exchange tubes to a greater degree, thus inducing reduced pressure and increased flow of cooling gas, aggravating the unbalanced condition. Such effect is obviated by the present invention by provision of repeated baffling and mixing of solid pellets in the heating zone and repeated mixing and splitting of streams of heat transfer gas in direct contact with the solids. Withdrawal of gas from contact with solids at a point below the top of the column of solids obviates disturbing the flow of solids by flowing gases therethrough at the top of the column and thus uniformity of treatment is assured at the time treatment is initiated.

We claim:

1. A process for drying and heat treating a particle-form adsorbent solid by contacting the same with a hot gaseous treating agent which comprises passing said solid as a compact mass downward through a treating zone having an upper heating section and a lower cooling section, baffling said solid in said heating section to provide a plurality of intercommunicating tortuous particle-free passages therethrough and to mix the particles of solid with each other during passage through said heating section, withdrawing said solid from said zone at a plurality of points below said cooling section at substantially the same rate throughout the cross section of said zone, passing cooling air in indirect heat exchange relationship with said solid in said cooling secton in generally countercurrent flow with respect to the flow of solid through said cooling section, burning fuel in air heated by heat exchange with said solid in said cooling section to produce hot products of combustion, introducing said products of combustion into said heating section at the bottom only at substantially uniform rate throughout the cross-section of said zone, passing products of combustion so introduced through said tortuous particle-free paths in direct contact with said solid in generally countercurrent flow with respect to the flow of said solid, and removing said products of combustion from contact with said solid at the top of said heating section below the top of said compact mass in said zone.

2. A process for drying and heat treating a particle-form adsorbent solid by contacting the same with a hot gaseous treating agent which comprises passing said solid as a compact mass downward through a treating zone having an upper heating section and a lower cooling section; baffling said solid in said heating section to provide a plurality of intercommunicating tortuous particle-free passages therethrough and to mix the particles of solid with each other during passage through said heating section; withdrawing said solid from said zone at a plurality of points below said cooling section at substantially the same rate throughout the cross-section of said zone, passing cooling air in indirect heat exchange relationship with said solid in said cooling section in generally countercurrent flow with respect to the flow of solid through said cooling section, further heating air preliminarily heated by heat exchange with said solid in said cooling section, introducing air so further heated into said heating section at the bottom only at substantially uniform rate throughout the cross-section of said zone, passing air so introduced through said tortuous particle-free paths in direct contact with said solid in generally countercurrent flow with respect to the flow of said solid, and removing air from contact with said solid at the top of said heating section below the top of said compact mass in said zone.

JOHN W. PAYNE.
CHARLES H. LECHTHALER.

REFERENCES CITED

The following references are of record in the file of this patent:

UNITED STATES PATENTS

| Number | Name | Date |
|---|---|---|
| 731,682 | Hillig | June 23, 1903 |
| 1,453,750 | Christenson | May 1, 1923 |
| 1,716,876 | Chamberlin | June 11, 1929 |
| 1,926,772 | Hess | Sept. 12, 1933 |
| 2,386,670 | Evans | Oct. 9, 1945 |
| 2,410,309 | Simpson et al. | Oct. 29, 1946 |
| 2,412,136 | Evans et al. | Dec. 3, 1946 |